H. M. BOE.
THRESHING MACHINE.
APPLICATION FILED MAR. 25, 1910.
1,017,129.
Patented Feb. 13, 1912.
3 SHEETS—SHEET 1.
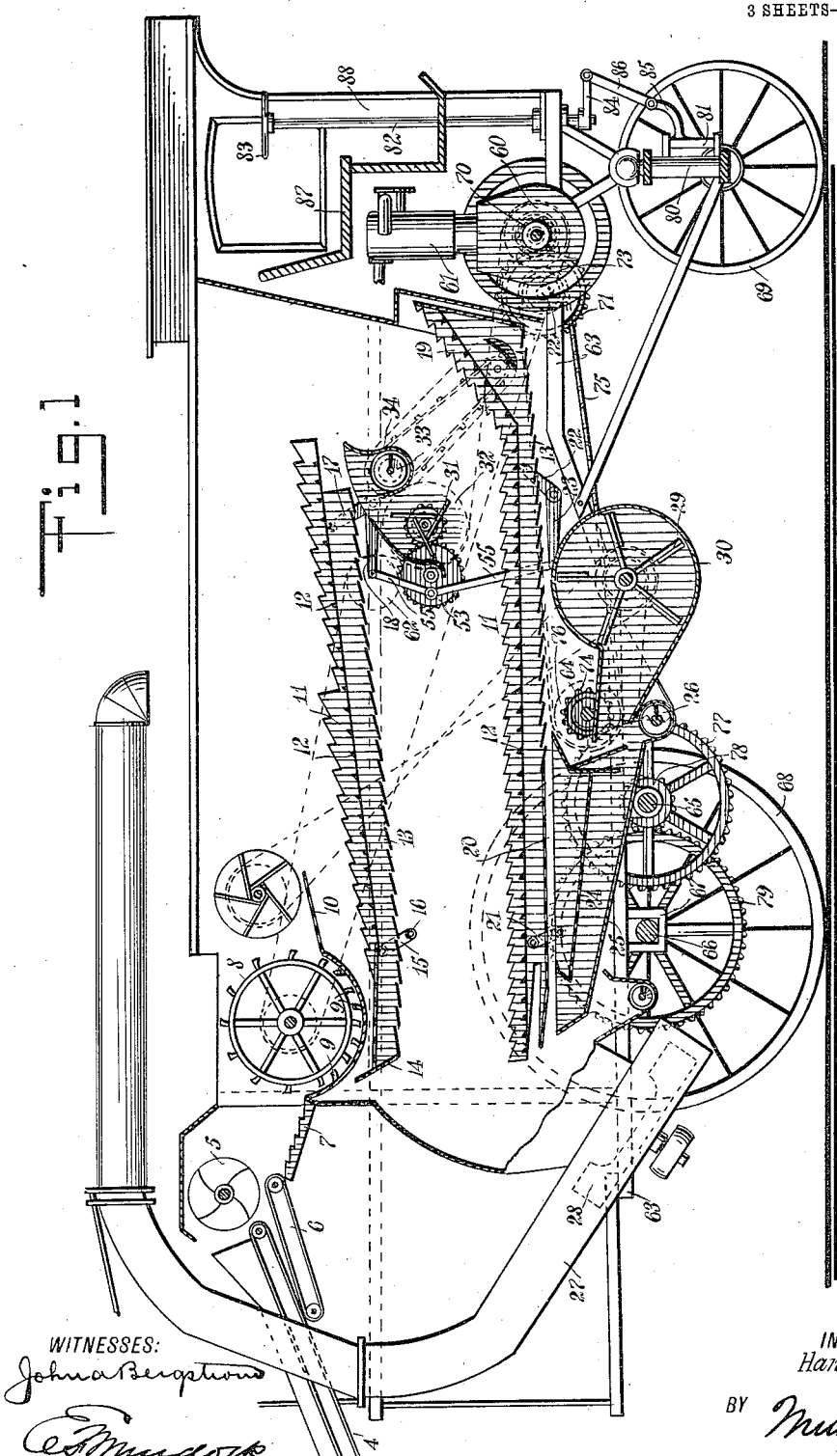
WITNESSES:
INVENTOR
Hans M. Boe
BY
ATTORNEYS H. M. BOE.
THRESHING MACHINE.
APPLICATION FILED MAR. 25, 1910.
1,017,129.
Patented Feb. 13, 1912.
3 SHEETS—SHEET 2.
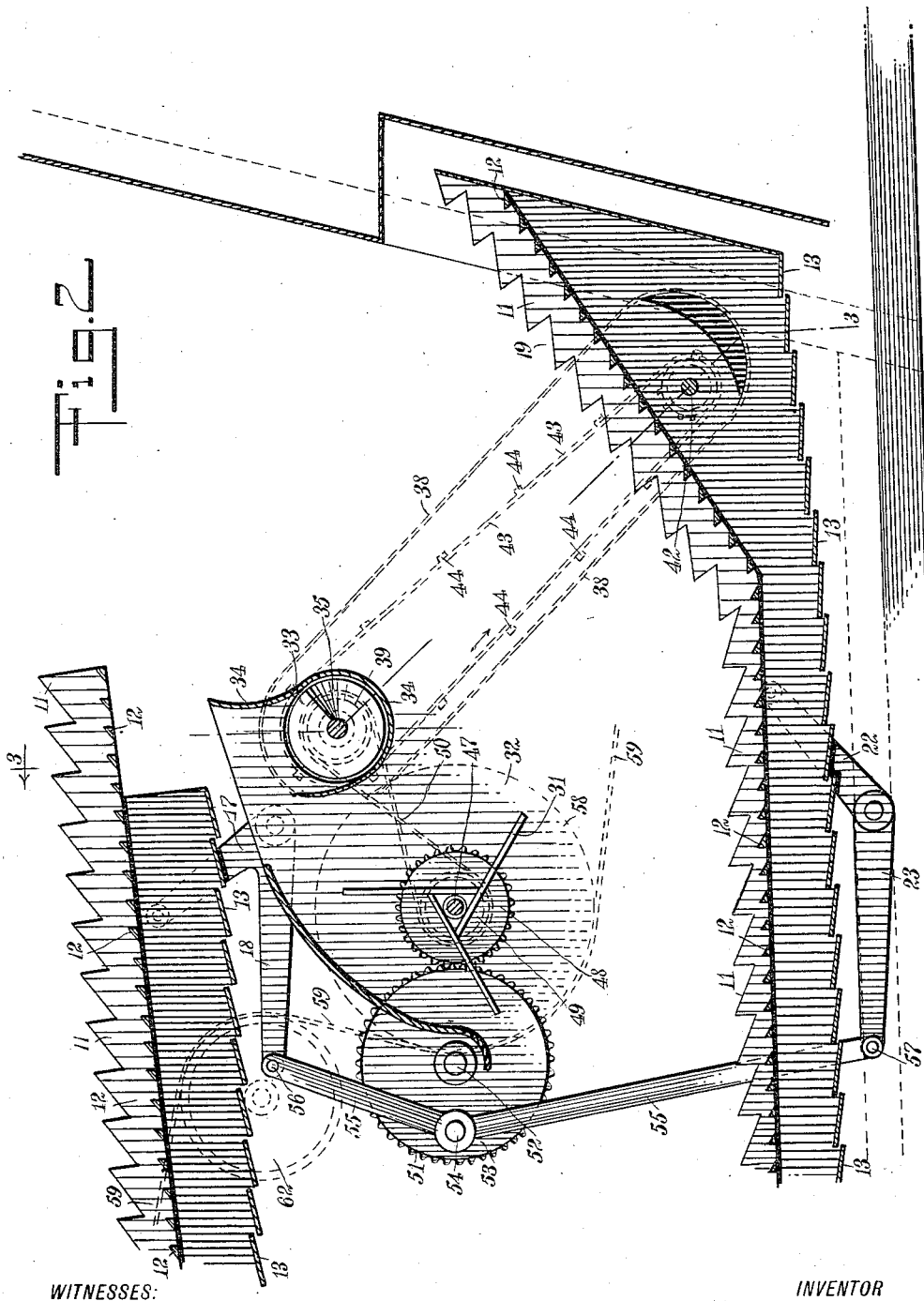
WITNESSES:
INVENTOR
Hans M. Boe
BY 
ATTORNEYS H. M. BOE.
THRESHING MACHINE.
APPLICATION FILED MAR. 25, 1910.
1,017,129.
Patented Feb. 13, 1912.
3 SHEETS—SHEET 3.
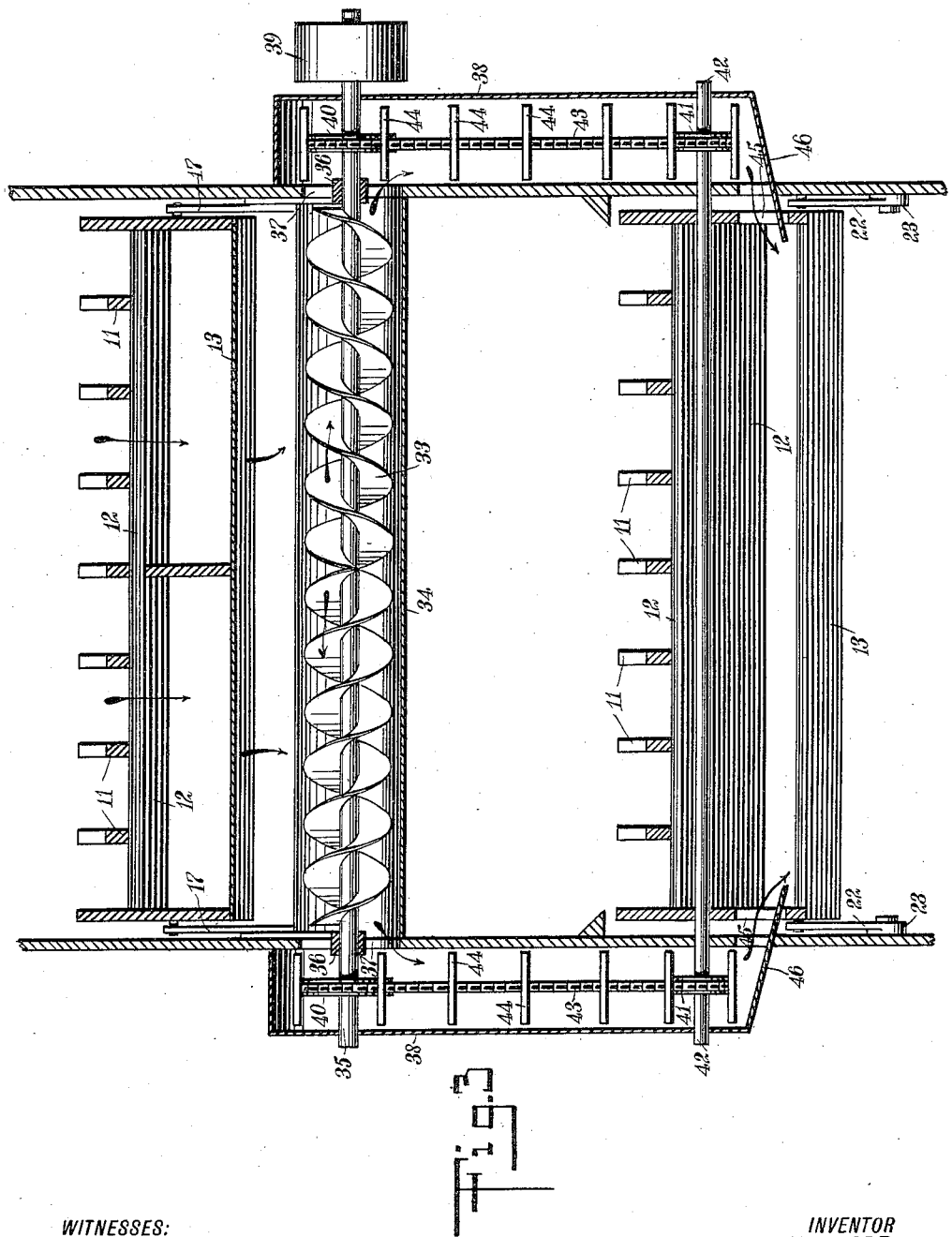
WITNESSES:
INVENTOR
Hans M. Boe
BY
ATTORNEYS

UNITED STATES PATENT OFFICE.

HANS M. BOE, OF HAMPDEN, NORTH DAKOTA.

THRESHING-MACHINE.

1,017,129.  Specification of Letters Patent.  Patented Feb. 13, 1912.

Application filed March 25, 1910.  Serial No. 551,469.

*To all whom it may concern:*

Be it known that I, HANS M. BOE, a citizen of the United States, and a resident of Hampden, in the county of Ramsey and State of North Dakota, have invented a new and Improved Threshing-Machine, of which the following is a full, clear, and exact description.

Among the principal objects which the present invention has in view are: to provide means for winnowing the straw, chaff, and grain in a threshing machine and to deliver the same across an air blast intermediate the grain conveyers of a threshing machine; and to provide a vibrating mechanism which is simple and efficient to counterbalance the weight of the upper and lower separating racks.

One embodiment of the present invention is disclosed in the structure illustrated in the accompanying drawings, in which like characters of reference denote corresponding parts in all the views, and in which—

Figure 1 is a vertical longitudinal central section of a threshing machine constructed and arranged in accordance with the present invention; Fig. 2 is an enlarged detail view in vertical longitudinal section, illustrating the arrangement of the winnowing racks and driving mechanism therefor, and showing the relation between the same and the conveyer mechanism for the grain and the auxiliary interposed air blast for cleaning the said grain in transit; and Fig. 3 is a vertical cross section taken on the line 3—3 in Fig. 2, illustrating the arrangement of the grain conveyers.

The threshing machine to which the present invention is applied is in the major part of known construction. A draper 4 delivers the straw and grain under a feeder 5, and over an apron 6 to a rack 7. From the rack 7 the straw is extracted by a threshing cylinder 8, being downwardly carried between projections 9, 9, where the straw is beaten or threshed and separated in part from the grain and heads or chaff. The broken mass is delivered over a platform 10 upon saw toothed racks 11. The racks 11 are constructed from a series of parallel rods disposed in edgewise arrangement, and separated to pass chaff heads or small rubbish to permit the same to rest on slabs 12, 12. The slabs 12, 12 are extended transversely across the frame carrying the racks 11, 11, and are wedge-shaped, the wedge being upturned and arranged to support small rubbish and the heavier chaff. The slabs 12, 12 are preferably pitched toward the delivery end of the rack with which they are incorporated. Directly below the slabs 12, 12 is a corrugated pan bottom 13, the corrugations wherein are low pitched and inclined upward toward the delivery end of the said pan. The frame is mounted in suitable side pieces, and closed at the rear by a partition 14. The upper winnowing frame thus described is, in the present instance, mounted upon a pivot link 15, which is pivotally secured at 16 to the side of the machine. At the opposite or delivery end of the winnowing frame it is secured to the arm 17 of a bell crank 18. The link 15 and bell crank 18 illustrated in Fig. 1 are duplicated on the opposite side of the machine, not shown in the said figure, and form the supports for the upper winnowing frame.

The winnowing frame above described is duplicated in the lower part of the box body of the threshing machine, where, however, the frame is changed in certain minor essentials. An inclined section 19 is provided at the forward end of the threshing machine to the more quickly deliver the straw from the forward end, and thereby relieve the possible congestion which might occur at this end of the machine. The saw toothed racks 11, and the slabs 12, are arranged in the manner above described. The corrugated bottom 13, is, however, limited, and delivers on to a perforated sieve 20 at the delivery end of the lower winnowing frame, which is co-incident with the rear end of the threshing machine frame. The lower winnowing frame is pivotally mounted on a link 21 at the delivery end of the said frame, and upon the short arm 22 of a bell crank 23 at the forward or receiving end of the said lower frame.

The grain, straw and chaff are, by the lower winnowing frame, delivered at the rear of the threshing machine, the grain passing through the sieve 20 upon an inclined sieve 24, and through the same upon the bottom of a shoe 25. The shoe 25 delivers at the lower end into a screw conveyer 26, transversely disposed and adapted to laterally deliver the grain to suitable receptacles conveniently placed.

The chaff and straw are delivered into a chute 27, a fan 28 therein driving the said chaff and straw upward through the said chute to be delivered out of the machine and upon what is known as the straw pile.

The grain, in the present invention, is delivered from the upper winnowing frame to the screw 26, by which it is delivered to be sacked in a manner differing from any of the known threshing machines, and in a manner to subject the grain more thoroughly to the cleansing influence of the air drafts provided for that purpose. The draft referred to is produced by a fan 29 mounted within a casing 30, as in former machines. This draft is directed against the grain while contained in the shoe 25 and while upon the sieve 24 thereof. This is the final cleansing imparted to the grain before the same is sacked. In the present invention the blast from the fan 25 is divided, being upwardly directed by a deflecting board and carried under the corrugated bottom 13 of the lower winnowing frame. The bottom 13 is perforated, perforations being preferably formed in the upright walls of the corrugations. The draft of air is thus directed from beneath against the layer of grain on the said bottom 13, which draft lifts the finer chaff during the vibration of the bottom 13, making the separation from the grain the easier when the same arrives at the sieve 20.

In the present invention a further blast is produced by a fan or beater 31, mounted transversely of the threshing machine and suitably journaled in the sides thereof. The beater 31 is suitably cased in a casing 32 which opens outwardly across the delivery end of the pan bottom 13 of the upper winnowing frame. The bottom 13 of the upper winnowing frame is arranged and disposed above a double pitched screw conveyer 33, which is likewise mounted transversely in the threshing machine and extended through the sides thereof. A cylindrical casing 34 is provided for the screw 33, the upper edge whereof is forwardly flared to provide for any miscalculated throw of the grain from the pan bottom 13. The grain, in passing thus from the bottom 13 to the screw 33, is at this point subjected to the gentle but constant draft of air from the beater 31. The result of this action is that when the grain passes to the screw 33 to be delivered thence to the pan bottom 13 in the lower winnowing frame, it is denuded of the major portion of the chaff which is of the lighter kind, having passed through the slats 12, 12, or carried on the grains by fibrous adherence.

The screw 33 is oppositely pitched, as illustrated in Fig. 3 of the drawings. A shaft 35, upon which the said screw is mounted, is journaled in bearings 36, 36, and suitable openings 37, 37 are provided for the extension of the bottom of the casing 34 beyond the sides of the threshing machine. Built outwardly from the sides of the threshing machine are casings 38, 38, into which the screw 33 forces the grain equally on opposite sides of the longitudinal center of the threshing machine. The shaft 35 is belt driven by a pulley 39, and is provided with two sprocket wheels 40, 40 on opposite ends of the said shaft. The sprocket wheels 40, 40 are alined with sprocket wheels 41, 41, which are mounted on a shaft 42 extended under the inclined section 19 of the rack forming part of the lower winnowing frame, and above the rear end of the bottom 13 of the said lower winnowing frame. The sprockets 40 and 41 are connected by a sprocket chain 43, at convenient intervals on which are mounted laterally extended blades 44, 44. The blades 44 on the under side of the casings 38 operate to scrape on the said under side to advance the material or grain as delivered thereon by the screw 33.

At the lower end of the casings 38 there are provided extensions 46, 46, which are passed through openings 45, 45 in the sides of the lower winnowing frame. The extensions 46, 46 serve to deliver the grain from the casings 38, 38 upon the bottom 13 of the lower winnowing frame. The blades 44, 44 serve to prevent the clogging of the grain in the casings 38, 38.

The beater 31 is provided with a shaft 47, at the outer end whereof is mounted a gear wheel 48 and a pulley 49. The pulley 49 is directly connected with the pulley 39 by a belt 50, thus securing a uniformity in the rotary action of the beater 31 and screw 33. The gear wheel 48 is meshed with a larger gear wheel 51, which is mounted upon a shaft 52, suitably journaled in the side of the threshing machine, and having fixedly mounted thereon a disk 53. The disk 53 is provided with a crank pin 54 on which are journaled connecting rods 55, 55. The rods 55, 55 are pivotally connected at 56 and 57 with the bell cranks 18 and 23 respectively. It will be observed that with the rotation of the disk 53 the long arms of the bell cranks 18 and 23 are lifted and lowered in alternate directions. The short arms 17 and 22 of the said bell cranks, being vertically extended, are rocked to oscillate the upper and lower winnowing frames in a horizontal path and in simultaneously opposite directions. In this manner the throw of each of the frames is counterbalanced and the operating strain on the disk 53, and the driving mechanism connected therewith, is proportionally eased.

Mounted upon the shaft 47 of the beater 31 is a large pulley 58, disposed to receive a driving belt 59, which is connected directly to the driving pulley 60 of a motor 61. An idler 62 is suitably mounted on the side of the frame and constructed in such manner as to take up the slack of the belt 59.

As thus far described the action of the threshing machine has been shown to effect a more thorough cleaning of the grain before the same is sacked. It has also been shown that the motive power furnished for the operation of the various fans and vibrating frames has been derived from the driving pulley of the motor. The motor 61 is suitably mounted at the forward end of the body of the threshing machine, a chassis having side rails 63 being formed and shaped to support the said motor and rotary parts connected therewith, and shafts 64 and 65 and the axles 66 of the rear carrying wheels. The axles 66 are held in guide loops 67, suitable springs being disposed above the said axles or interposed between the chassis rail and the body of the thresher to relieve the jar of the traction on the wheels 68 and 69. The driving shaft for the motor 61 is provided with a suitable gear pinion 70, which is tooth engaged with a gear wheel 71 mounted in suitable bearings formed on the side rails 63. The gear wheel 71 is fixedly mounted on a shaft 72, on which is mounted a small sprocket wheel 73. The sprocket wheel 73 is connected with a sprocket 74, fixedly mounted on the shaft 64. The gear wheel 74 is connected with the gear wheel 73 by a sprocket chain 75. Fixedly attached to the shaft 64 is a smaller gear wheel 76, which is meshed in toothed engagement with a large gear wheel 77. The gear wheel 77 is fixedly mounted on the shaft 65, on which is similarly mounted a small gear wheel 78. The small gear wheel 78 is meshed in toothed engagement with a large gear wheel 79. The reducing gears interposed between the motor 61 and the driving traction wheel 68 are the pinion 70, wheels 71 and 73, chain 75, and wheels 74, 76, 77, 78 and 79. The transmission gear, in combination with the motor 61, and the traction wheel 68, constitute the tractor feature of the present invention.

The wheels 69 are swiveled in suitable knuckles 80 provided in the forward axles. Extension arms 81 connected with the said knuckles are operated by a steering post 82, at the upper end of which is a wheel 83, and at the lower end of which is an extension arm 84. The arm 84 and an arm 85 are connected by a link 86, whereby the wheels are turned to either the right or the left. In the present form of construction the motor is disposed below a driver's seat 87 in the cab 88 provided for the protection of the driver.

With a threshing machine equipped with a tractor and driving mechanism as above described, the operation consists in using the tractor mechanism for transferring the threshing machine from point to point. When having arrived at the station for work, the motor is disconnected from the tractor mechanism and connected with the driving mechanism. Suitable clutches, belt shifters, or other well known and suitable means are employed to vary the operative connection of the motor 61 with the two distinct mechanisms.

Any form of motor, and transmission mechanism connected therewith, for driving the traction wheels 68 may be employed, together with speed gears of any approved type of construction. In the present drawings I have limited the illustration to a common type of internal combustion engine, and the simplest form and most direct mounting of a transmission mechanism for utilizing the engine for transportation purposes.

By the arrangement of the beater 31 and the inclined section 19 of the lower rack 11, the straw received from the upper rack at the delivery end thereof is advanced to the delivery end of the lower rack the more quickly. Should the straw tend to clog at this point, the blades of the beater 31 serve to advance the straw as well as to operate as a fan to winnow the grain.

Having thus described my invention, what I claim as new and desire to secure by Letters Patent is:—

1. A threshing machine of the character specified comprising a box-like body; a plurality of approximately horizontal superposed straw racks arranged to advance the straw thereon in opposite directions; an inclined straw rack section formed on the lower of said straw racks; a rotary beater mounted in bearings in said body and extended transversely across the lower of said racks and having arms adapted to remove the straw from said inclined rack section toward the delivery end of the lower of said straw racks; and means for rotating the said beater and vibrating the said racks.

2. A threshing machine of the character specified comprising a box-like body; a plurality of superposed straw racks vibratively mounted therein; means for vibrating said straw racks to advance material thereon in opposite directions; a grain pan mounted on the upper of said racks arranged to deliver the grain therefrom near the straw delivery end of said rack; a conveyer trough disposed below the delivery end of said grain pan; a beater rotatively mounted in said body having blades adapted to impinge upon and spread the straw upon the lower of said racks and to cause an air current between said grain pan and said conveyer trough; and a shield for guiding said air current.

3. A threshing machine of the character specified comprising a body portion; a plurality of superposed straw racks vibratively mounted therein; a sharply inclined end rack section rigidly mounted on the lower of said straw racks at the receiving end thereof; a grain pan mounted on the upper of said racks arranged to deliver the grain delivered from near the straw delivery end of said rack; a conveyer trough transversely mounted in said body below the delivery end of said grain pan to receive the grain therefrom; a rotary full-bladed beater rotatively mounted in said body adapted to distribute straw on the lower of said racks and to create an air current to flow between the said grain pan and said conveyor trough; a shield for said beater to guide the air current produced thereby; a vibrator mechanism for said straw racks; and a transmission mechanism connecting the said beater, and vibrating mechanism.

In testimony whereof I have signed this specification in the presence of two subscribing witnesses.

HANS M. BOE.

Witnesses:
G. GRIMSON,
REGINA B. BOE.

Copies of this patent may be obtained for five cents each, by addressing the "Commissioner of Patents, Washington, D. C."